(12) United States Patent
Fuchs et al.

(10) Patent No.: US 11,760,050 B2
(45) Date of Patent: Sep. 19, 2023

(54) APPARATUS FOR SEPARATING MATERIALS OF DIFFERENT FLOWABILITY THAT ARE MIXED TOGETHER

(71) Applicant: Nordischer Maschinenbau Rud. Baader GmbH + Co. KG, Lübeck (DE)

(72) Inventors: Michael Fuchs, Lübeck (DE); Friedemann Hanf, Lübeck (DE); Joachim Härtlein, Lübeck (DE); Uwe Karsten, Lübeck (DE); Olaf Schwarz, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 20 days.

(21) Appl. No.: 17/376,536

(22) Filed: Jul. 15, 2021

(65) Prior Publication Data
US 2022/0016862 A1   Jan. 20, 2022

(30) Foreign Application Priority Data

Jul. 15, 2020  (DE) ................. 10 2020 118 644.4
Jul. 15, 2020  (DE) ................. 10 2020 118 720.3
Nov. 27, 2020  (EP) ................... 20210211

(51) Int. Cl.
*B30B 15/08*  (2006.01)
*B30B 9/24*  (2006.01)
*B30B 15/30*  (2006.01)

(52) U.S. Cl.
CPC .............. *B30B 9/241* (2013.01); *B30B 15/08* (2013.01); *B30B 15/30* (2013.01)

(58) Field of Classification Search
CPC ..... A22C 17/004; A22C 17/04; A22B 5/0035; B30B 9/241
See application file for complete search history.

(56) References Cited

U.S. PATENT DOCUMENTS 4,156,384 A   5/1979  Hinds, Jr. et al.
4,637,094 A   1/1987  Matsubayashi
(Continued)

FOREIGN PATENT DOCUMENTS

CN   107471720 A   12/2017
DE     2627786 A1   12/1977
(Continued)

*Primary Examiner* — Matthew Katcoff
(74) *Attorney, Agent, or Firm* — DINSMORE & SHOHL LLP

(57) ABSTRACT

An apparatus for separating materials of different flowability that are mixed together has a frame structure; a hollow drum driven in a rotational direction and having a perforated peripheral surface and an open end face; a continuous press belt pressed from outside onto the peripheral surface when wrapped around part of the circumference of the drum; a product intake wedge formed by the belt and drum, for conducting a product stream into the apparatus between the drum and belt; and a device for discharging separated product, which has been pressed from the outside through the perforated peripheral surface into the hollow chamber, from the end face. The discharging device includes a scraping element in an upper region of the drum, and includes at least one scraping element section, which has a tilt angle of more than 90° to a tangential plane of the peripheral surface against the direction of rotation.

19 Claims, 5 Drawing Sheets

(56) References Cited

U.S. PATENT DOCUMENTS

| | | | |
|---|---|---|---|
| 5,241,901 A | 9/1993 | Kunig | |
| 5,507,689 A * | 4/1996 | McFarland | ............ A22C 17/04 452/138 |
| 5,674,117 A | 10/1997 | Kunig et al. | |
| 5,894,791 A | 4/1999 | Rose et al. | |
| 9,089,876 B2 | 7/2015 | Hoppe | |
| 2021/0037837 A1 | 2/2021 | Gunther | |

FOREIGN PATENT DOCUMENTS

| | | | |
|---|---|---|---|
| DE | 2558726 | B2 | 10/1979 |
| DE | 3516623 | A1 | 11/1985 |
| DE | 3907401 | C1 | 3/1990 |
| DE | 4116476 | A1 | 11/1992 |
| DE | 9313610 | U1 | 1/1995 |
| DE | 29518810 | U1 | 1/1996 |
| DE | 202010011056 | U1 | 11/2011 |
| DE | 102018101985 | B3 | 9/2018 |
| GB | 1217189 | A | 12/1970 |
| JP | 3935143 | B2 | 6/2007 |
| WO | 2020127086 | A1 | 6/2020 |

\* cited by examiner

APPARATUS FOR SEPARATING MATERIALS OF DIFFERENT FLOWABILITY THAT ARE MIXED TOGETHER

CROSS-REFERENCE TO RELATED APPLICATIONS

This application claims priority to German Application 10 2020 118 720.3 filed Jul. 15, 2020; German Application 10 2020 118 644.4 filed Jul. 15, 2020; and European Application 20 21 0211.7 filed Nov. 27, 2020, all of which are hereby incorporated by reference in their entirety.

FIELD OF THE INVENTION

The invention concerns an apparatus, configured and adapted for separating materials of different flowability that are mixed together, comprising a frame or frame structure; a hollow drum which is mounted on the frame structure and driven in rotation and has a perforated peripheral surface and at least one at least partially open end face; a continuous press belt which can be pressed from the outside onto the peripheral surface when wrapped around part of the circumference of the hollow drum and which is driven in circulation in the conveying direction; a product intake wedge formed by the press belt and hollow drum, for conducting a product stream, consisting of a product to be pressed, into the apparatus between the hollow drum and the press belt in an inlet area or inlet zone of the product stream; and a device for discharging separated product, pressed from the outside through the perforated peripheral surface into the hollow or hollow chamber of the hollow drum, from the at least partially open end face of the hollow drum.

The invention furthermore concerns a method for separating materials of different flowability that are mixed together, comprising the steps: supply of a product stream, comprising a product to be pressed, into a product intake wedge which is formed by a hollow drum with perforated peripheral surface and a press belt which lies on the hollow drum from the outside, wrapped around part of the circumference; driving the hollow drum and/or the press belt in circulation in order to draw in the product stream between the hollow drum and the press belt, wherein the more easily flowing constituents of the product stream are pressed as separated product into the hollow chamber of the hollow drum by means of the press belt through the perforations of the peripheral surface of the hollow drum, and discharged from an at least partially open end face of the hollow drum, while the less easily flowing constituents of the product stream remain on the outside of the peripheral surface of the hollow drum and are discharged separately.

BACKGROUND OF THE INVENTION

Such apparatuses and methods are used in various industrial sectors, in particular however in the foodstuff-processing industry. With the apparatus described above, which are also known as press-separating machines or separators, various types of materials can undergo a separation process. For this, the materials to be separated, i.e. the product to be pressed or product to be separated (which is also known as separates), are pressed from the outside against the perforated peripheral surface M of the hollow drum by means of a pressing element such as a press belt. Under this pressure, the more easily flowing constituents of the pressed product as main product are pressed through the perforations of the peripheral surface M into the inner hollow chamber of the rotating hollow drum from where they are discharged, while the less easily flowing constituents of the pressed product as secondary product remain on the outside on the peripheral surface of the hollow drum, and in particular remain also at or on the surface of the pressing element and are discharged separately. The secondary products, also known as the residue of the pressed product, may in particular adhere to the pressing element, lie on the pressing element, fall off the pressing element, and also fall off the outer peripheral surface M of the hollow drum or be detached therefrom e.g. by means of a scraper element. All residue which is not pressed through the perforations of the peripheral surface M of the hollow drum is conveyed out of the apparatus via the discharge element as a residual stream and at least partially processed further.

Substances, materials or products which differ in their composition by their mutually different flow behavior are accessible for separation in the sense of the invention. The possibility and/or need for separating materials of different flowability that are mixed together exists in particular in the production of foodstuffs of animal origin (e.g. separating the meat from the skin, tendons, bones or fins etc.), or fruit and vegetables (e.g. separating the fruit flesh from the shell, peel, stem, core or stones etc.), when processing incorrectly packed foodstuffs (e.g. separating butter or cheese from packing material) or similar. Specific application examples are for example pitting dates or unpacking foil-packed cheese slices.

During processing, coring, stoning, pitting or unpacking or any other corresponding separation, a product stream is conveyed from a product supply region with a product intake wedge between the pressing element, e.g. the press belt, and the hollow drum, through to a product output region. The product intake wedge is formed by the arrangement of the press belt to the hollow drum, and leads to an (inlet) angle in the inlet area of the product stream into the apparatus. The rotational drive of the hollow drum and/or the circulating drive of the press belt draws in the product stream in the inlet area between the hollow drum and the press belt in the conveying direction F, so that a distance/gap (filled with product stream) exists between the press belt and the hollow drum. Behind the product intake wedge (in the conveying direction of the product stream), a pressing zone is created between the press belt and the hollow drum due to the wrapping, through which the product stream is conveyed. The materials of different flowability are here separated in that the more easily flowing materials—using the example of processing products of animal origin, the meat—are pressed into the hollow drum at least partially as separated product, which in the example of products of animal origin consists of small threads of meat or small strands of meat, from where they are discharged. Discharge takes place via an at least partially open end face of the hollow drum, e.g. on the front of the apparatus, wherein the front may also be defined as the rear. The less easily flowing materials—again, in the example of processing products of animal origin, the bones, tendons, skin etc.—are collected as secondary products in the product output region behind the hollow drum in the conveying direction F of the product stream, and discharged. The part of the product stream which has been pressed through the perforated peripheral surface M into the interior of the hollow drum, i.e. into the hollow chamber, is discharged as separated product and conducted for further processing. However, the remaining part of the product stream, which has not been pressed into the interior of the hollow drum through the perforated peripheral surface M, together with its less easily flowing constituents, normally adheres at least partially to the outside of the peripheral surface of the hollow drum. This residual product stream adhering to the outside of the hollow drum may be detached for example by outer scraper means.

The separated product is discharged via an at least partially open end face of the hollow drum, e.g. on the front of the apparatus, wherein the front may also be defined as the rear. Usually, a scraping element and/or an ejector screw is/are provided for discharging the separated product. These serve to scrape the separated product from the inner face of the hollow drum and also ensure that the separated product leaves the drum.

Such an apparatus is known for example from DE 35 16 623A1. The separating apparatus disclosed there has a scraper in the lower region of the drum in order to conduct the accumulated separated product out from the drum interior. The scraper scrapes away the separated product present on the drum interior and discharges this from the drum. To support this process, it is known to arrange the scraper at an angle to the drum axis. In conjunction with the rotational movement of the drum, the separated product is moved away from the rear region of the drum towards the open end face of the drum, and leaves the drum.

In the case of a conventional scraper, the separated product accumulates on the scraper, i.e. the separated product builds up on the scraper to a relevant extent, and a following product is pressed onto a product already present, before it leaves the drum. Due to this accumulation of the separated product on the scraper, the separated product is compressed, which is associated with a change in product structure. The separated product is greatly compacted and tends to become slimy, which hinders the discharge process and reduces the product quality for subsequent processes.

SUMMARY OF THE INVENTION

The invention is therefore based on the object of improving the discharge process from the drum interior and providing an apparatus and method for separating substances of different flowability, which ensure that the product structure of the separated product is retained and in particular no compaction of a previously loose product structure takes place.

This object is achieved according to the invention with an apparatus of the type cited hereinbefore in that the device for discharging the separated product comprises a scraping element which is arranged in the upper region of the hollow drum, in particular in a position that corresponds at least substantially to the 12 o'clock position, and which has at least one scraping element section, wherein the scraping element section is a first scraping element section which is adjacent to the inside of the peripheral surface and has a tilt angle $\alpha$ of more than 90° to the tangential plane of the peripheral surface against the direction of rotation.

Here the wording "corresponds at least substantially to the 12 o'clock position" in the sense of the present invention means a position which lies between 10 o'clock and 2 o'clock, in particular between 11 o'clock and 1 o'clock, in particular in the region which is defined firstly by a position between 11 and 12 o'clock on one side and between 12 o'clock and 1 o'clock on the other. The reference for the position is the first scraping element section. With the front edge of the drum in the rest position as an imaginary clock face, the reference point for the position is the point at which the first scraping element section meets the drum edge or would meet this in its extension. Particularly preferably, the scraping element is arranged in a position between 11 and 12 o'clock. In this region, the separated product on the drum inner face still has an upward speed component directed against the force of gravity. The separated product can therefore be detached from the drum inner face in this region in a particularly gentle fashion, which is very protective for the product. An additional acceleration as well as the force of gravity present in any case is avoided, so that the separated product falls down more gently.

The tangential plane of the peripheral surface in the sense of the present invention is the plane which touches the peripheral surface in the straight line in which a theoretical extension of the center of the scraping element in the width extent would intersect the peripheral surface.

The tilt angle $\alpha$ to the tangential plane of the peripheral surface against the direction of rotation is the angle which is formed with the scraping element in front of the scraping element in the direction of rotation. Conversely, the tilt angle to the tangential plane of the peripheral surface in the direction of rotation is the angle which is formed by the tangential plane of the peripheral surface with the scraping element behind the scraping element in the direction of rotation.

Due to the arrangement of the scraping element section in the upper region of the hollow drum and at an angle to the tangential plane of the peripheral surface, a build-up of separated product on the scraper is avoided. In contrast to the case of a conventional arrangement of the scraper at an angle of 90° to the tangential plane, in the embodiment according to the invention, the separated product is not suddenly stopped by the scraper but the speed provoked by the rotation of the drum can be dissipated more slowly. Even a slight difference from the conventionally arranged scrapers due to the angle is sufficient to prevent a build-up. In addition, due to the arrangement of the scraper in the upper drum region, it is ensured that the separated product falls into the lower region of the drum under the influence of gravity. The separated product, which is effectively "planed" from the drum inside by the scraping element, retains its loose product structure since it falls freely and is not compressed or crushed. The separated product undergoes a twist from the scraping element according to the invention, which further loosens the structure and avoids crushing. The angle of the scraper leads to a gentle initial separation of the accumulated product stream. A force is introduced into the product stream which triggers an incipient breaking up thereof. Depending on the nature of the product to be processed, smaller or larger product part quantities are thus separated out of the product stream and supplied to the lower region of the drum with the support of gravity.

Particularly preferably, the tilt angle $\alpha$ is greater than or equal to 105°, preferably greater than or equal to 110°, and in particular greater than or equal to 115°. Furthermore, the tilt angle is preferably less than or equal to 135°, preferably less than or equal to 130°, and in particular less than or equal to 125°. Particularly preferably, the tilt angle lies in a range from 105° to 135°, preferably in a range from 110° to 130°, and in particular in a range from 115° to 125°. Such angles ensure that the separated product is detached from the drum inner face in a particularly efficient and gentle fashion.

In a further preferred embodiment, the scraping element has a second scraping element section which has an angle to the first scraping element section. The phrase "has an angle" here means that the scraping element sections have an angle $\beta$ relative to one another which is not equal to 180°, preferably an angle $\beta$ against the direction of rotation of between 90° and 180°, in particular between 120° and 160°.

The second scraping element section supports the initiated process of breaking up of the product stream and causes firstly product part quantities which have already been separated to be conveyed securely in the direction of the lower drum region, and secondly detached but not yet separated areas of the product stream to be definitively separated as product part quantities, in order then to also be conducted in the direction of the lower drum region.

Particularly preferably, the second scraping element section is arranged on the edge of the first scraping element section facing away from the peripheral surface and substantially parallel to the direction of the active gravitational force.

The term "substantially parallel" in the sense of the present invention means that the second scraping element section is arranged parallel to the direction of the active gravitational force or at an angle of up to 10°, in particular an angle of up to 5°, deviating from this direction in the one or other direction.

With a conventional design of the apparatus, i.e. when the base/underside of the apparatus is oriented parallel to the floor on which the apparatus is erected, the direction of the active gravitational force corresponds to an orientation perpendicular to the tangential plane of the peripheral surface in the 12 o'clock position. If the apparatus is erected with a tilt, the direction of the active gravitational force deviates from the perpendicular to the tangential plane of the peripheral surface in the 12 o'clock position by an angle which corresponds to the tilt of the apparatus.

The 12 o'clock position is the position of the drum which is closest to the top of the apparatus in the normal configuration of the apparatus.

The combination of the first and second scraping element sections in said arrangement and orientation gives a particularly brief contact of the separated product with the scraping element. The duration of contact of the separated product with the separating element is of decisive importance for the quality of the product. The better it is guaranteed that a temporally sustained, sliding frictional contact between the separated product and scraping element is as small as possible, the less the separated product is compressed and the looser it remains. In contrast to conventional separating devices with conventional scraping elements, in the present invention the entire separated product does not move along the scraping element out of the drum. Instead, the separated product separated by the first scraping element section falls loosely downward, mostly at a distance from the second scraping element section. The second scraping element section arranged parallel to the active gravitational force has a certain delimiting and guiding function, but does not guide the separated product, as in conventional scrapers along which the separated product is moved out of the drum.

In yet a further preferred embodiment, the scraping element has a third scraping element section which is arranged on the edge of the second scraping element section facing away from the first scraping element section, and has an angle γ of less than 90°, preferably less than 75°, in particular less than 50° to the tangential plane of the peripheral surface in the direction of rotation. This third scraping element section ensures that product part quantities, which are thrown against the deflector element because of inherent dynamics due to the eddying process in the lower drum region, are again conducted downward with as little adhesion as possible. The third scraping element section may be tilted in the direction of the drum axis. In particular, the end of the third scraping element section pointing towards the rear end face may be higher than the end pointing towards the front.

Preferably, the length of the second scraping element section is at least twice, preferably at least three times and in particular at least four times the length of the first and/or third scraping element section. Thus the second scraping element section, oriented parallel to the gravitational force, is the largest of the three sections in terms of dimensions. It has been found that even a relatively slight extent in the radial direction for the first scraping element section is sufficient to achieve the desired effect. The length of the first scraping element section is preferably 0.1 to 0.5 times, in particular 0.2 to 0.4 times the drum radius.

With respect to the total extent of the scraping element from the inside of the peripheral surface M in the radial extent direction of the drum interior, this advantageously amounts to 0.5 to 1.5 times, preferably 0.8 to 1.3 times, in particular 0.9 to 1.1 times the drum radius. Thus it is ensured that firstly, the separated product detached from the interior of the drum casing does not remain on the drum inside but instead is conducted to the outlet region of the drum where it is discharged, and secondly the separated product can fall freely into the lower region of the drum, and there are no unnecessary surfaces on which the separated product can come into contact with the scraping element. Therefore in the lower region, there is more space for the separated product to leave the drum. A limitation by the scraping element is not necessary at this point and would only lead to unnecessary and undesired additional adhesion contact.

There are different variants for the orientation of the scraping element with respect to the drum axis. In conventional scrapers arranged in the lower region of the drum, an arrangement with a particular angle was preferred such that the front end of the scraping element is arranged further forward in the direction of rotation than the end directed towards the rear of the drum. This would support and facilitate the discharge of the separated product from the drum towards the front. Such an arrangement is also possible with the scraping element of the present invention. Particularly preferably, the scraping element is however arranged parallel to the drum axis. In this way, the separated product part quantities conducted downward are guided not directly in the direction of the end face drum outlet but substantially vertically downward. The continuing rotation of the drum accordingly gives the product part quantities an eddying twist over a period lasting over several drum revolutions, which has a further advantageous effect on the consistency of the separated product. In other words, the product part quantities are gently loaded during eddying, so as to give a loose, crumbly internal product structure. In particular, the time of contact of the product part quantities with the drum casing inner face is significantly reduced, so that in this phase too, a sliding friction between the separated product and mechanical components is reduced to a minimum.

The separated product discharged from the hollow drum by means of the scraping element may fall onto any discharge conveyor element in order to be transported away for further processing or packing. This may for example be a—preferably cooled—trough or channel, or a conveyor belt.

The scraping element preferably consists of metal, in particular stainless steel. The latter meets the particular requirements imposed on materials used in the foodstuff-processing industry. Ceramic materials may however also be used.

In a further preferred embodiment, a removable lip is attached to the end of the first scraping element section facing the peripheral surface M. In this way, it is possible to exchange separately the region of the scraping element subjected to the greatest wear, without having to replace the entire scraping element. The lip may in particular consist of the same material as the scraping element, preferably stainless steel. It is also possible for the lip to consist of another material. Preferred materials here are plastic or rubber.

There are various possibilities for fixing the scraping element. Preferably, the scraping element is arranged on a carrier protruding into the hollow chamber of the hollow drum. This carrier may protrude into the drum from the front or rear side. Usually, the drum is closed on the rear side so that the carrier preferably protrudes into the drum from the front. Particularly preferably, the scraping element is arranged on a crosspiece which is preferably releasably attached to the frame structure. In this way, the scraping element protrudes through the at least partially open end face into the hollow drum. Such an arrangement allows simple replacement of the scraping element when required. Also, the scraping element can thereby very easily be removed from the drum, and the entire area of the drum is thus easily accessible for cleaning for example.

It is possible to assign a cooling device to the hollow drum, wherein the cooling device is configured and adapted for cooling the separated product by means of a cryogenic cooling medium during processing.

During intake of the product stream between the hollow drum and the press belt on the one hand, and during the actual separating process, substantial pressures and high friction levels occur, whereby the product stream and in particular the separated product pressed or crushed through the perforations is heated. In particular in the foodstuff-processing industry, during processing of fresh products in particular such as meat and fruit, it is extremely important to cool the products as continuously as possible or keep the cooling interruptions as short as possible. By cooling the hollow drum, it is possible to cool the product or product stream to be processed not only before processing, and the separated product after processing i.e. after leaving the apparatus, but also during the separating process, i.e. during the actual processing.

During processing here means that the separated product is cooled while still in the hollow drum when it swells out of the openings of the perforated peripheral surface of the hollow drum on the inside as a meat thread or strand. Thus a continuous cooling chain can be achieved even during the separating process. At least it is ensured that the interruptions of the cooling chain for the separated product are short if the cryogenic medium acts directly on the separated product during pressing, i.e. immediately after it enters the hollow chamber. Cryogenic cooling media and in particular liquid cryogens allow efficient and rapid cooling of the separated product on contact with its surface. Cryogenic cooling agents are here preferably liquid nitrogen or liquid carbon dioxide.

Preferably, the cooling device is arranged in the hollow or hollow chamber of the hollow drum and comprises at least one nozzle which is connected to a reservoir of cooling medium via a supply line.

In a further preferred embodiment, between the end of the first scraping element section facing the peripheral surface (M) and the peripheral surface, there is a distance of at least 0.5 mm, preferably at least 1.5 mm, particularly preferably at least 2 mm, in particular at least 3 mm. The drum casing has a degree of play in the rotational movement. The distances given above ensure that despite a degree of play of the drum, the scraping element does not hit the drum and damage it. It is also desirable for the separated product to remain in the drum for at least one revolution before being scraped away. This applies in particular if cooling takes place during the separating process, so that particularly good cooling of the separated product is ensured. A certain distance from the first scraping element section to the drum casing is therefore desirable. The maximum distance is preferably 5 mm in order to comply with the requirements of working safety.

The scraping element according to the invention and the particular eddying of the separated product caused thereby, especially during cooling, ensure that this cooling reaches the entire separated product, even the interior thereof, since a particularly internal mixing is achieved without the separated product being crushed and compacted. With the apparatus according to the invention, it is therefore possible to obtain a particularly well-cooled separated product, which at the same time has a loose structure.

The present invention also concerns a scraping element for an apparatus as described above. Such a scraping element is configured and adapted for attachment in the upper region of the hollow drum, in particular in a position which corresponds at least substantially to the 12 o'clock position, and at a tilt angle to the tangential plane of the peripheral surface of the hollow drum of more than 90° against the direction of rotation. Preferably, the scraping element is formed from at least two scraping element sections which have an angle to one another. Particularly preferably, the scraping element comprises three scraping element sections which have an angle to one another such that in side view, the scraping element as a whole—depending on rotation direction of the drum—has the form of a stylized "S" or stylized question mark.

This object is furthermore achieved by a method with the steps cited hereinbefore, in which the separated product pressed through the perforated peripheral surface M into the hollow chamber of the hollow drum is scraped away from the inner surface of the hollow drum in the upper region of the hollow drum, in particular in a position which corresponds at least substantially to the 12 o'clock position.

With the method according to the invention, it is possible to obtain a separated product of loose granular structure, i.e. to significantly improve the quality of the separated product.

Preferably, the separated product is scraped away by means of the scraper with a first scraping element section which is adjacent to the inside of the peripheral surface and has an angle α of more than 105°, preferably more than 110°, in particular more than 115°, to the tangential plane of the peripheral surface against the direction of rotation. Scraping in this fashion leads to a particularly gentle initial separation of the inflowing product stream, which is particularly protective for the product. Depending on the nature of the product to be processed, scraping in this fashion already separates product part quantities from the product stream and supplies these to the lower region of the drum with the support of gravity.

As described above for the apparatus, with the method according to the invention a build-up of separated product on the scraper can be avoided. Because the first scraping element section has an angle of >90° to the tangential plane of the peripheral surface against the direction of rotation, in the embodiment according to the invention, the separated product is not suddenly stopped by the scraper but the speed provoked by the rotation of the drum can be dissipated more slowly. Even a slight difference from the conventionally arranged scrapers due to the tilting is sufficient to prevent a build-up. In addition, due to the arrangement of the scraper in the upper drum region, it is ensured that the separated product falls into the lower region of the drum under the influence of gravity. The separated product which is effectively "planed" from the drum inside by the scraping element retains its loose product structure since it falls freely and is not compressed or crushed. Furthermore, with the scraping element according to the invention, the separated product undergoes a twist whereby it acquires a very loose structure and crushing is avoided. The angle of the scraper leads to a gentle initial separation of the accumulating product stream. A force is introduced into the product stream which triggers an incipient break up thereof. Depending on the nature of the product to be processed, smaller or larger product part quantities are separated out of the product stream and supplied to the lower region of the drum with the support of gravity.

Quite particularly preferably, the method is carried out with an apparatus with at least one feature as described herein.

The method according to the invention allows a low-contact detachment of the separated product from the drum inner face, wherein the contact time of the separated product with the scraping element is minimized. In contrast to conventional scrapers, the separated product is not pushed along the scraper in order to be discharged from the drum. Instead, the separated product is scraped away and further loosened by falling. The separated product is conducted out of the drum supported by the rotational movement of the drum.

Further advantages resulting from the above-mentioned method steps have already been described in connection with the apparatus, so to avoid repetition, reference is made to the above statements.

BRIEF DESCRIPTION OF THE DRAWINGS

Further suitable and/or advantageous features and developments of the apparatus and method arise from the present description. Particularly preferred embodiments of the apparatus and method are explained in more detail with reference to the appended drawing.

DETAILED DESCRIPTION OF THE INVENTION

Figure 1:
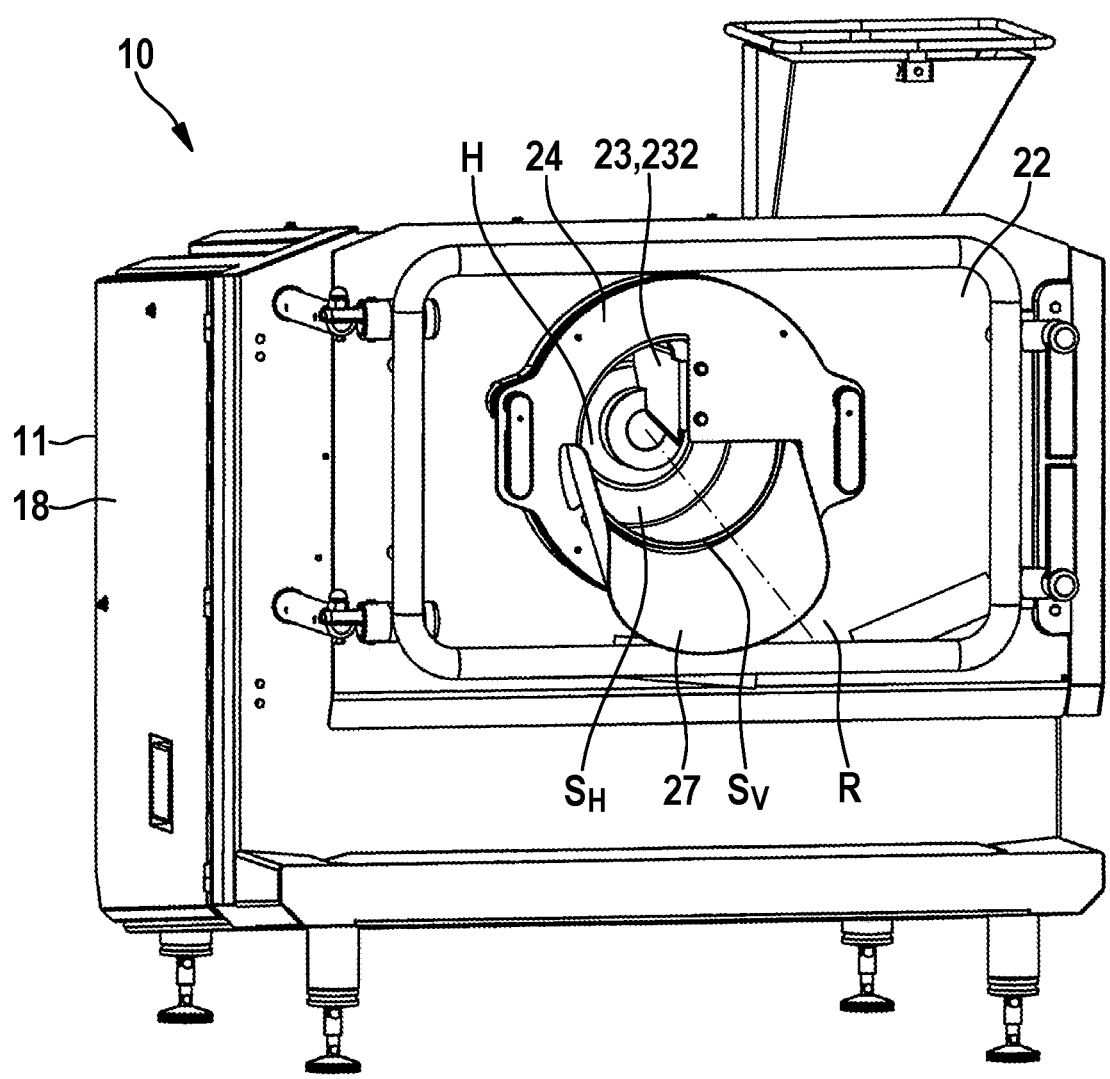
FIG. 1 is a schematic depiction of the apparatus according to the invention with a closed front hatch, in a perspective view.

The apparatus shown in the drawing serves to separate meat, on the one hand, and bones, bone residue, tendons, cartilage and similar, on the other hand, and has a plurality of preferred features. Other embodiments, which may have fewer or other features, are not illustrated explicitly. The apparatus may also be used in the same fashion for separating e.g. fruit flesh from cores, stones, pips, or for separating any other mixed materials of different flowability.

The apparatus 10 depicted is configured and adapted for separating materials of different flowability that are mixed together. The apparatus 10 comprises a frame or frame structure 11, a hollow drum 12 which is driven in rotation and mounted on the frame structure 11, has a perforated peripheral surface M and an at least partially open end face SV; a continuous press belt 13 which is driven in circulation and can be pressed from the outside onto the peripheral surface when wrapped around part of the circumference of the hollow drum 12; a product intake wedge 14 formed by the press belt 13 and hollow drum 12 for conducting a product stream, consisting of a product to be pressed, into the apparatus 10 between the hollow drum 12 and the press belt 13 in an inlet area or inlet zone E of the product stream; a support apparatus 15 for the press belt 13 with at least one support element 16 which is arranged on the side of the press belt 13 opposite the hollow drum 12; and a device 17 for discharging separated product, pressed through the perforated peripheral surface M into the hollow or hollow chamber H of the hollow drum 12, from the at least partially open end face SV of the hollow drum 12.

The device 17 for discharging the separated product from the hollow drum 12 may be an integral part of the apparatus or be formed as a separate component. The end face $S_V$ of the hollow drum 12 pointing towards the front is formed open, while the opposite end face $S_H$ is preferably formed closed. The front and rear sides may also be exchanged.

The features and developments described below, viewed alone or in combination, constitute preferred embodiments. It is expressly pointed out that features which are grouped together in the claims and/or description and/or drawing, or described in a common embodiment, may also functionally independently refine the above-mentioned apparatus 10.

The frame or frame structure 11 may be for example a closed or at least partially closed housing or a profile structure or similar. Preferably, the housing is substantially closed on all sides. The drive unit (not shown) for the hollow drum 12 and/or the press belt 13 is arranged on or in the frame structure 11. The drive unit may comprise a common drive or separate drive means. The axis of rotation R of the hollow drum 12 runs transversely to the conveying direction F of the press belt 13. Bores/openings (merely indicated in the figure and not illustrated explicitly) are formed in the perforated peripheral surface M of the hollow drum 12 and may be arranged in different patterns, to allow the passage of parts of the product stream—in particular the more easily flowing, soft and crushable parts—into the interior of the hollow drum 12. The hollow drum 12 is preferably provided with openings over its entire depth or width which forms the working region. The press belt 13 preferably consists of an elastic material e.g. rubber, polyurethane or similar, and is guided over several deflection elements 19. Particularly preferably, the deflection element 19 which is placed behind the hollow drum 12 in the conveying direction F is configured as a drive roller 20 for drawing the press belt 13 and hence the product stream over the hollow drum 12. Particularly preferably, the drive roller 20 is simultaneously configured and adapted as a contact roller and/or tensioning roller for the press belt 13. For this, the drive roller 20 is designed to be adjustable. The separate drive for the hollow drum 12 may further support the conveying of the product stream in the conveying direction F.

Figure 4:
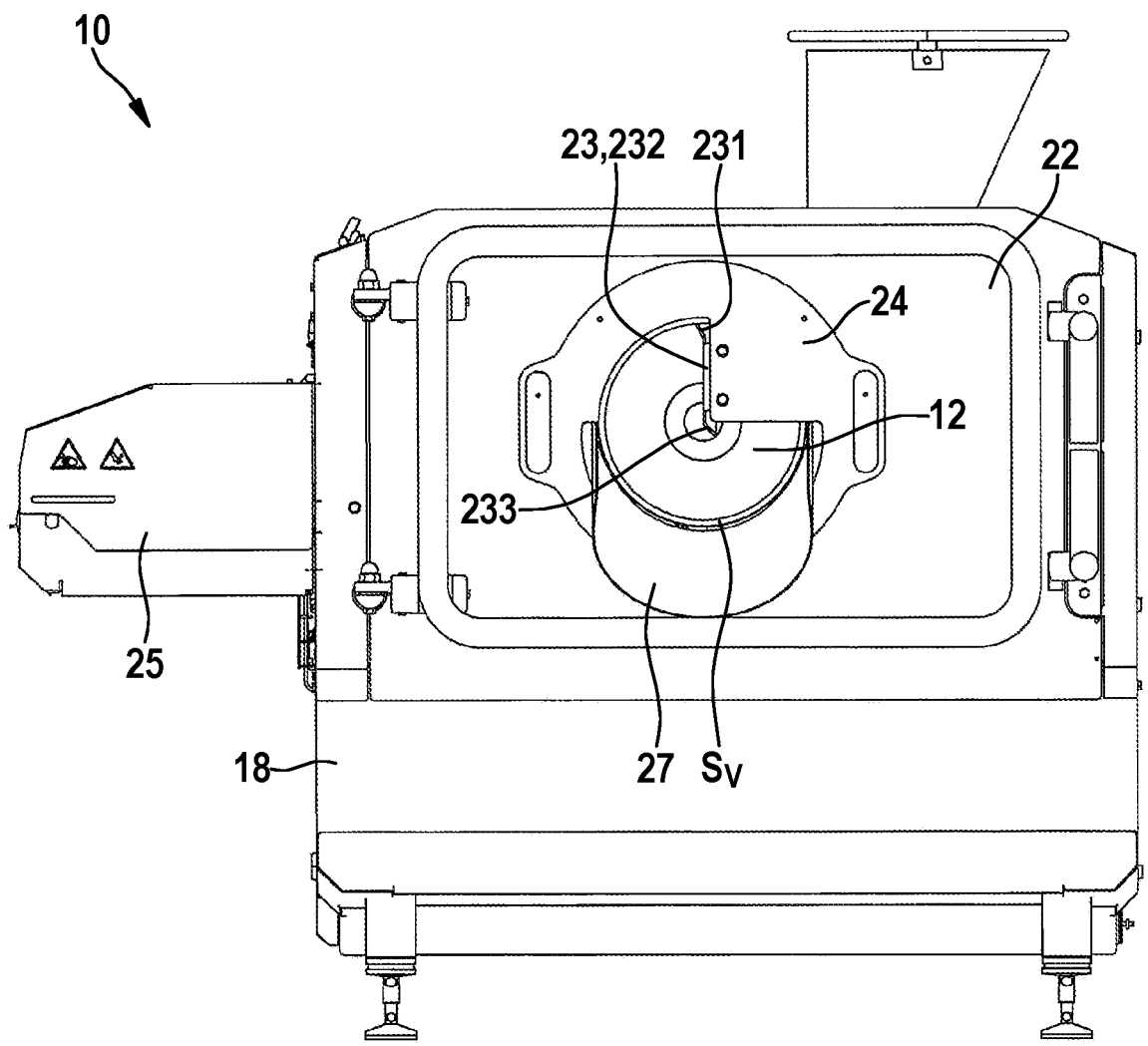
FIG. 4 is a front view of the embodiment according to FIG. 3.

Optionally, outer scraper elements may be arranged in the inlet area or inlet zone E, i.e. above the product intake wedge 14, and/or in the outlet area or outlet zone A, i.e. behind the hollow drum 12 (also known as a perforated drum) in the conveying direction F. These outer scraper elements may be mounted rigidly, i.e. with a fixed distance from the hollow drum 12 or more precisely from the peripheral surface M, or be controllable variably, i.e. their distance from the hollow drum 12 or more precisely the peripheral surface M can be changed. In addition, the apparatus 10 may comprise a discharge conveyor belt (not shown) in order to remove from the press belt 13 the less easily flowing constituents which have been separated from the product stream and remain on the outside of the press belt 13. In the embodiment shown in FIG. 4, the discharge conveyor belt protrudes beyond the housing 18 and is protected by a cover 25.

The hollow drum 12 and the press belt 13 may be driven with the same speed. Optionally, the hollow drum 12 and the press belt 13 may however also be driven with different speeds. The speed difference is controllable and/or regulatable by means of a control and/or regulating device. The support apparatus 15 may be a support chain, a support belt or a roller track.

Particularly preferably, the frame or frame structure 11 is configured as a housing 18 which comprises a closed working chamber 21 receiving at least the hollow drum 12, the press belt 13 and the support apparatus 15, and has a hatch 22 on at least one side which can be opened and closed and covers the working chamber 21 with the exception of the at least partially open end face $S_V$ of the hollow drum 12. The hatch 22 may constitute a front hatch of the housing 18. The front hatch in closed state allows partitioning of the working chamber 21 from the environment. In open state, when out of use, accessibility for cleaning and/or maintenance purposes is guaranteed. The housing 18 may however also have other closable openings and access points at other positions.

The separated product, pressed through the peripheral surface M, is discharged by means of the discharge device 17 in the form of scraping element 23, in conjunction with the rotation of the hollow drum 12, and in some cases by means of a subsequent discharge element 27, from which the separated product may fall into a trough (not shown) or onto a conveyor belt (also not shown).

Figure 3:
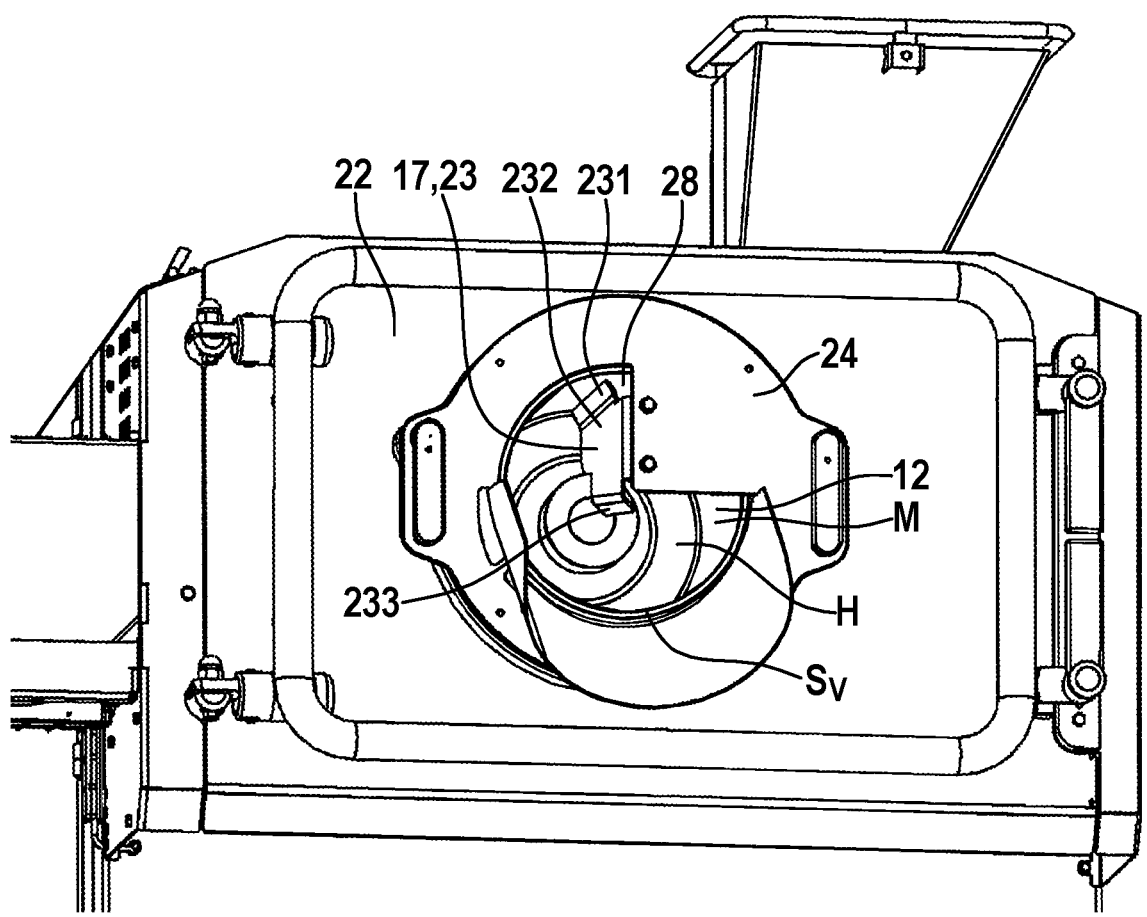
FIG. 3 is a schematic, partial depiction of a further embodiment of the apparatus according to the invention with a closed front hatch, in a perspective view from the front.

FIG. 3 shows the scraping element 23 which is releasably attached to the crosspiece 24. The scraping element 23 is arranged in the upper region of the hollow drum 12 at a position which corresponds substantially to the 12 o'clock position 28 or shortly before the 12 o'clock position. The scraping element 23 has three scraping element sections 231, 232, 233. The first scraping element section 231 is arranged adjacent to the inside the peripheral surface M and has a tilt angle α of approximately 115° to the tangential plane of the peripheral surface against the direction of rotation.

The first scraping element section 231 scrapes the separated product from the drum inside when it has covered at least a partial revolution in the hollow drum 12. Because of the angling of the first scraping element section 231, the separated product is gently lifted off the peripheral surface M and, under the influence of gravity, falls into the lower region of the hollow drum 12, from where it moves in the direction of the open end face $S_V$ because of the rotation of the hollow drum 12. Since the separated product does not therefore accumulate on the scraping element 23, it retains its loosened product structure. The discharged separated product may fall for example onto a discharge trough 27 or similar, which optionally may be cooled and for this connected to a corresponding device.

A second scraping element section 232 is arranged on the edge of the first scraping element section 231 facing away from the peripheral surface M, namely at an angle β of approximately 150° to the first scraping element section 231. The second scraping element section is arranged substantially parallel to the active gravitational force and perpendicular to the tangential plane of the peripheral surface M at the 12 o'clock position.

A third scraping element section 233 is arranged on the edge of the second scraping element section 232 facing away from the first scraping element section 231. This has an angle γ of approximately 45° to the tangential plane of the peripheral surface M in the direction of rotation U.

Figure 5:
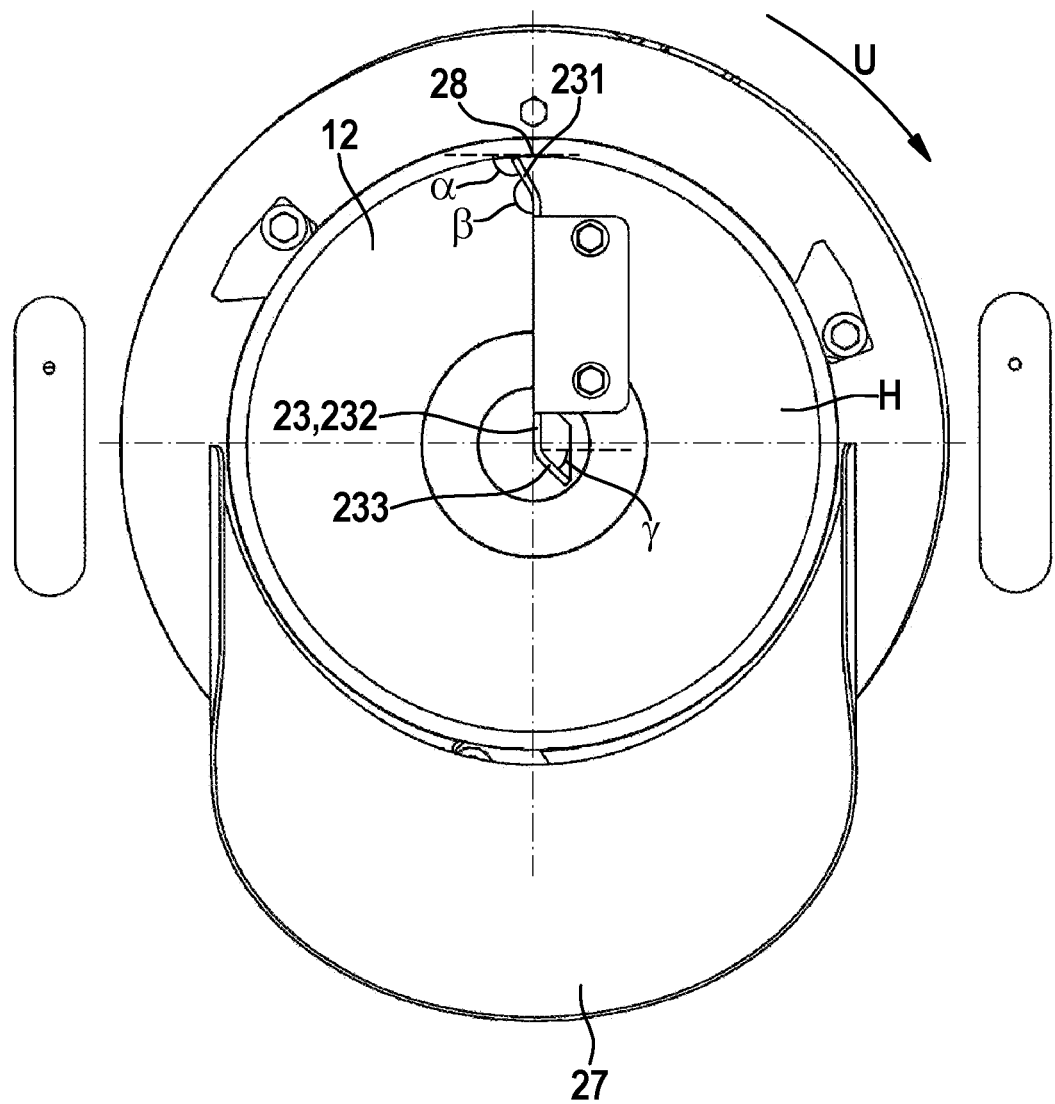
FIG. 5 is a front view of the drum from the embodiment shown in FIG. 4, in which the front hatch has been omitted in order to show the arrangement of the scraper element in the drum.

The scraping element 23 is arranged parallel to the drum axis R and takes the form of a stylized question mark. The total extent of the scraping element 23 from the inside of the peripheral surface M in the radial extent corresponds to the drum radius. The length of the second scraping element section 232 is here approximately 5 times the length of the first scraping element section 231, and approximately 6 times the length of the second scraping element section 233. The edge of the scraping element 23 facing the peripheral surface M is spaced by 2 mm from the peripheral surface. In the embodiment shown in FIGS. 4 and 5, the third scraping element section 233 is tilted in the direction of the drum axis so that the end of the third scraping element section 233 pointing towards the rear end face $S_H$ of the hollow drum 12 lies higher than the end pointing towards the front.

Figure 2:
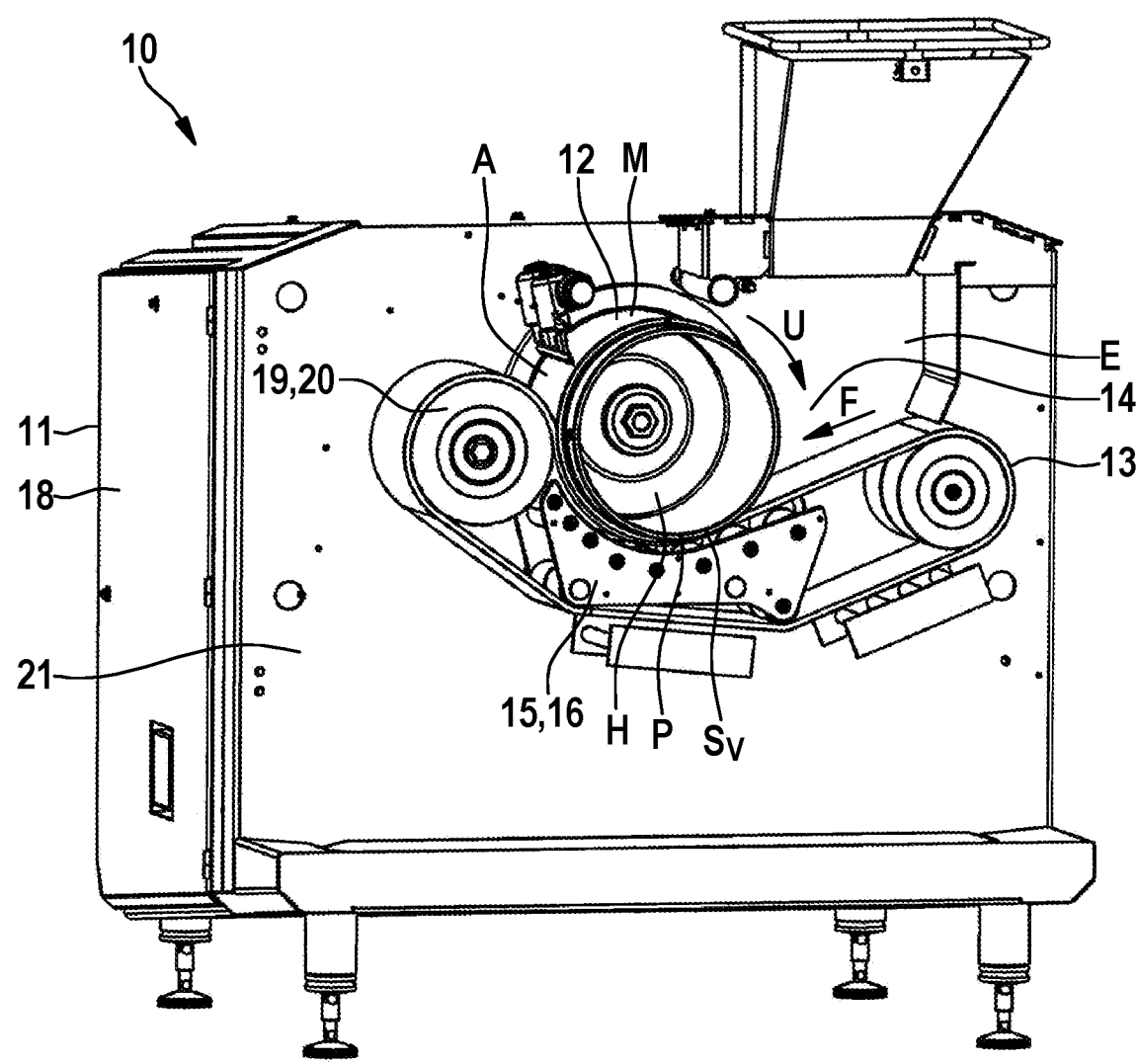
FIG. 2 is a schematic depiction of the apparatus according to FIG. 1 without the front hatch, in a perspective view.

The method is described in more detail below with reference to the drawing. The method serves, and is accordingly configured and adapted, for separating materials of different flowability that are mixed together. Firstly, a product stream, comprising a product to be pressed, is supplied to a product intake wedge 14 which is formed by a hollow drum 12 with perforated peripheral surface M and a press belt 13, which lies on the hollow drum 12 from the outside, wrapped around part of the circumference. For the separating process, the hollow drum 12 and the press belt 13 are driven in circulation in order to draw in the product stream between the hollow drum 12 and the press belt 13. Preferably, the hollow drum 12 is driven clockwise while the drive roller 20 for the press belt is driven counterclockwise (evident in the view in FIG. 2), so that the hollow drum 12 and the press belt 13 have the same conveying direction F in the region of the wrapping, i.e. in the pressing zone P, wherein the speeds may be the same or different from one another. Due to transport of the product stream through the pressing zone P, the more easily flowing constituents of the product stream are pressed as separated product into the inner hollow chamber H of the hollow drum 12 by means of the press belt 13 through the perforations of the peripheral surface M of the hollow drum 12, and discharged from an at least partially open end face $S_V$ and/or $S_H$ of the hollow drum 12, while the less easily flowing constituents of the product stream remain on the outside of the peripheral surface M of the hollow drum 12 and are discharged separately, Preferably, during separation of the product stream into its constituents, the press belt 13 is supported by a support apparatus 15 comprising at least one supporting element 16 on the side of the press belt 13 opposite the hollow drum 12.

To discharge the separated product, the first scraping element section 231 of the scraping element 23 scrapes the separated product, pressed through the perforated peripheral surface M into the hollow chamber H of the hollow drum 12, from the inner face of the hollow drum 12 in a shortly before 12 o'clock position, in the upper region of the hollow drum 12. Scraping takes place very gently and is therefore very protective for the product because of the angled arrangement of the first scraping element section 231. The existing structure of the separated product is retained and is not compacted. The separated product falls into the lower region of the hollow drum 12 under the influence of gravity, wherein because of the scraping element according to the invention it undergoes a twist which supports the retention of a loose structure.

Since the scraping element 23 is arranged parallel to the drum axis R, the separated product part quantities conducted downward are not conducted directly in the direction of the open end face $S_V$ of the hollow drum 12 but guided substantially vertically downward. The continuing rotation of the hollow drum 12 accordingly gives the product part quantities an eddying twist over a period lasting over several drum revolutions, which has a further advantageous effect on the consistency of the separated product. This also reduces the contact time of the product part quantities with the drum casing inner face, so that a sliding friction between the separated product and mechanical components is reduced to a minimum.

Because of the rotation of the hollow drum 12, the separated product is moved in the direction of the open end face $S_V$ and in this way leaves the hollow drum via the discharge element 27, e.g. in a cooled trough (not shown), for transport or for further processing.

The invention claimed is:

1. An apparatus for separating materials of different flowability that are mixed together, comprising:
a frame structure;
a hollow drum mounted on the frame structure and driven in rotation in a rotational direction, the hollow drum having a perforated peripheral surface and at least one at least partially open end face;
a continuous press belt pressed from outside onto the peripheral surface of the hollow drum when wrapped around part of a circumference of the hollow drum, the continuous belt being driven in circulation in a conveying direction;
a product intake wedge formed by the press belt and hollow drum, for conducting a product stream, consisting of a product to be pressed, into the apparatus between the hollow drum and the press belt in an inlet area of the product stream; and
a device for discharging separated product pressed from the outside through the perforated peripheral surface into a hollow chamber of the hollow drum from the at least partially open end face of the hollow drum;
wherein the device for discharging the separated product comprises a stationary scraping element disposed in an upper region of the hollow drum, the scraping element having at least one scraping element section, the at least one scraping element section includes a first scraping element section which is adjacent to an inside of the peripheral surface and has a tilt angle of greater than or equal to 105° to a tangential plane of the peripheral surface against the direction of rotation.

2. The apparatus according to claim 1, wherein the stationary scraping element in the upper region of the hollow drum is disposed in a position that corresponds at least substantially to a 12 o'clock position.

3. The apparatus according to claim 1, wherein the tilt angle is greater than or equal to 110° or greater than or equal to 115°.

4. The apparatus according to claim 1, wherein the at least one scraping element section includes a second scraping element section which has an angle to the first scraping element section and wherein the second scraping element section is radially inboard relative to the first scraping element section.

5. The apparatus according to claim 4, wherein the second scraping element section is arranged on an edge of the first scraping element section facing away from the peripheral surface and substantially parallel to a direction of the active gravitational force.

6. The apparatus according to claim 1, wherein the at least one scraping element section includes a third scraping element section which is arranged on an edge of the second scraping element section facing away from the first scraping element section and has an angle of less than 90°, or less than 75°, or less than 50°, to the tangential plane of the peripheral surface in the direction of rotation.

7. The apparatus according to claim 6, wherein a length of the second scraping element section is at least twice, or at least three times, or at least four times a length of the first and/or third scraping element section.

8. The apparatus according to claim 1, wherein a total extent of the stationary scraping element from the inside of the peripheral surface in a radial extent amounts to 0.5 to 1.5 times, or 0.8 to 1.3 times, or 0.9 to 1.1 times the drum radius.

9. The apparatus according to claim 1, wherein between an end of the first scraping element section facing the peripheral surface and the peripheral surface, there is a distance of at least 0.5 mm, or at least 1 mm, or at least 2 mm, or at least 3 mm.

10. The apparatus according to claim 1, wherein the at least one stationary scraping element is arranged parallel to the drum axis.

11. The apparatus according to claim 1, further comprising a removable lip attached to an end of the first scraping element section facing the peripheral surface.

12. The apparatus according to claim 1, wherein the at least one stationary scraping element is arranged on a carrier protruding into the hollow chamber of the hollow drum.

13. The apparatus according to claim 12, wherein the at least one stationary scraping element is arranged on a crosspiece which is releasably attached to the frame structure.

14. The apparatus according to claim 1, further comprising a cooling device assigned to the hollow drum and configured and adapted for cooling the separated product using a cryogenic cooling medium during processing.

15. A method for separating materials of different flowability that are mixed together, comprising the steps:
supplying a product stream, comprising a product to be pressed, into a product intake wedge which is formed by a hollow drum with a perforated peripheral surface and a press belt which lies on and is wrapped around a part of a circumference of the hollow drum from outside;
driving the hollow drum and/or the press belt in circulation in order to draw in the product stream between the hollow drum and the press belt;
wherein more easily flowing constituents of the product stream are pressed as separated product into a hollow chamber of the hollow drum by the press belt through the perforations of the peripheral surface of the hollow drum, and discharged from an at least partially open end face of the hollow drum, while less easily flowing constituents of the product stream remain on the outside of the peripheral surface of the hollow drum and are discharged separately;
scraping away separated product, which was pressed through the perforated peripheral surface into the hollow chamber of the hollow drum, from an inner surface of the hollow drum in an upper region of the hollow drum, the scraping away step comprising scraping away the separated product by a stationary scraping element with a first scraping element section which is adjacent to an inside of the peripheral surface and has an angle of greater than or equal to 105° to a tangential plane of the peripheral surface against a direction of rotation.

16. The method according to claim 15, wherein the upper region of the hollow drum corresponds at least substantially to a 12 o'clock position.

17. The method according to claim 15, wherein the angle is more than 130°.

18. The method according to claim 15, further comprising providing the apparatus of claim 1.

19. An apparatus for separating materials of different flowability that are mixed together, comprising:
- a frame structure;
- a hollow drum mounted on the frame structure and driven in rotation in a rotational direction, the hollow drum having a perforated peripheral surface and at least one at least partially open end face;
- a continuous press belt pressed from outside onto the peripheral surface of the hollow drum when wrapped around part of a circumference of the hollow drum, the continuous belt being driven in circulation in a conveying direction;
- a product intake wedge formed by the press belt and hollow drum, for conducting a product stream, consisting of a product to be pressed, into the apparatus between the hollow drum and the press belt in an inlet area of the product stream; and
- a device for discharging separated product pressed from the outside through the perforated peripheral surface into a hollow chamber of the hollow drum from the at least partially open end face of the hollow drum;

wherein:

the device for discharging the separated product comprises a stationary scraping element disposed in an upper region of the hollow drum, the stationary scraping element having at least one scraping element section, the at least one scraping element section includes a first scraping element section which is adjacent to an inside of the peripheral surface and has a tilt angle of more than 90° to a tangential plane of the peripheral surface against the direction of rotation;

the at least one scraping element section includes a second scraping element section which has an angle to the first scraping element section; and the second scraping element section is radially inboard relative to the first scraping element section.

* * * * *